Oct. 7, 1930.   F. W. SEECK   1,777,702
DIFFERENTIAL MECHANISM
Filed Oct. 29, 1927   4 Sheets-Sheet 1
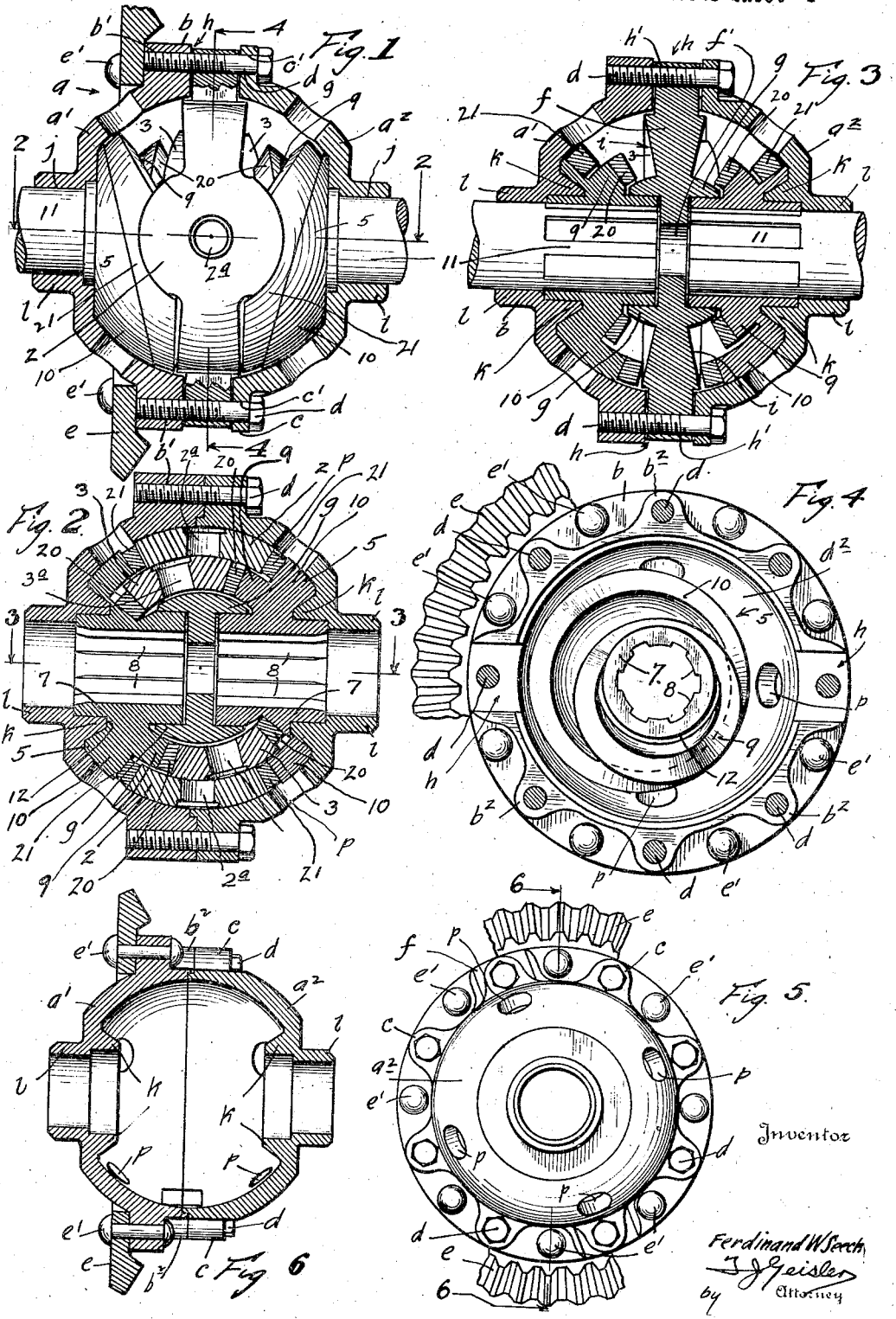

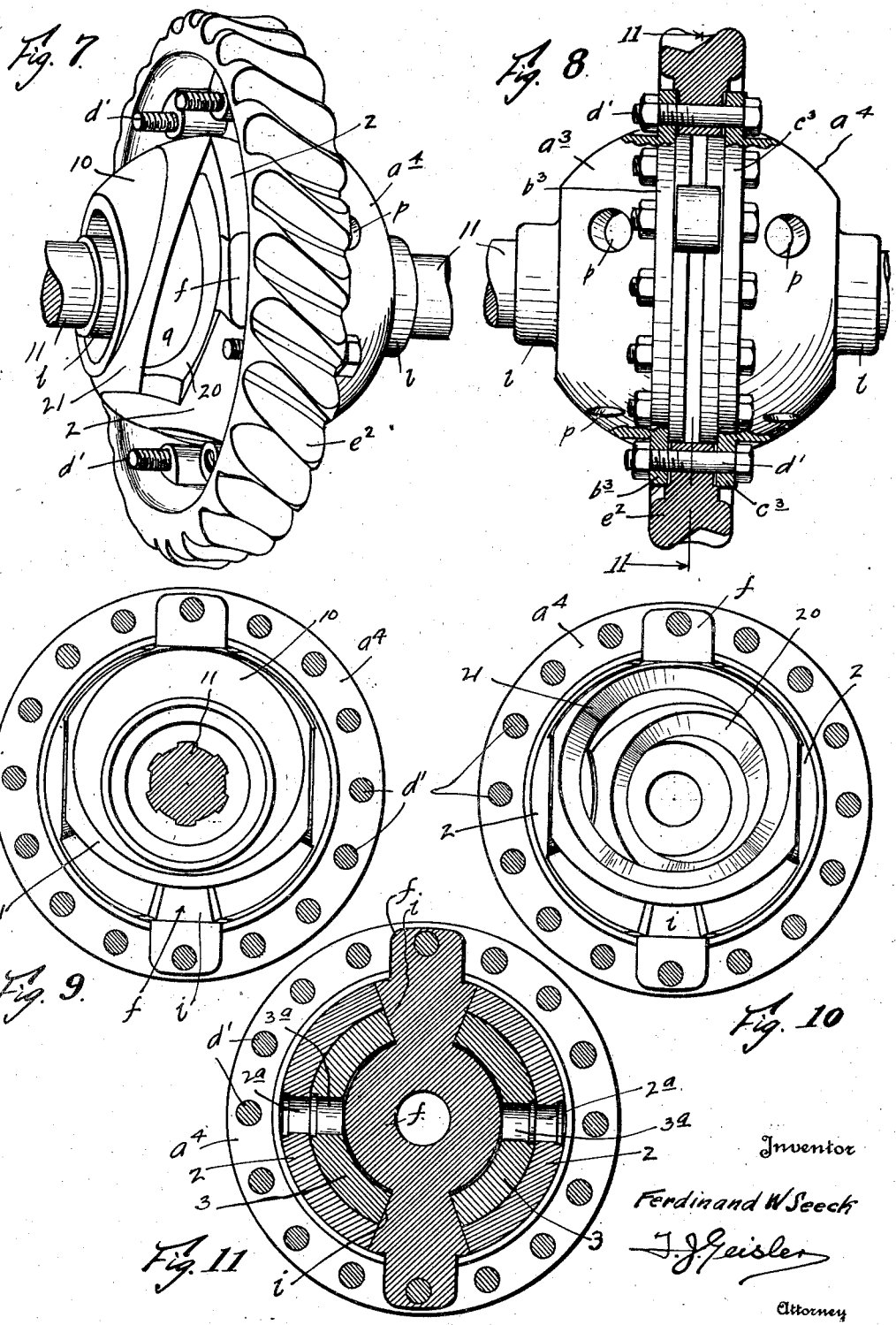

Oct. 7, 1930.　　　　F. W. SEECK　　　　1,777,702
DIFFERENTIAL MECHANISM
Filed Oct. 29, 1927　　4 Sheets-Sheet 3

Inventor:
Ferdinand W. Seeck
by J. J. Geisler
Atty.

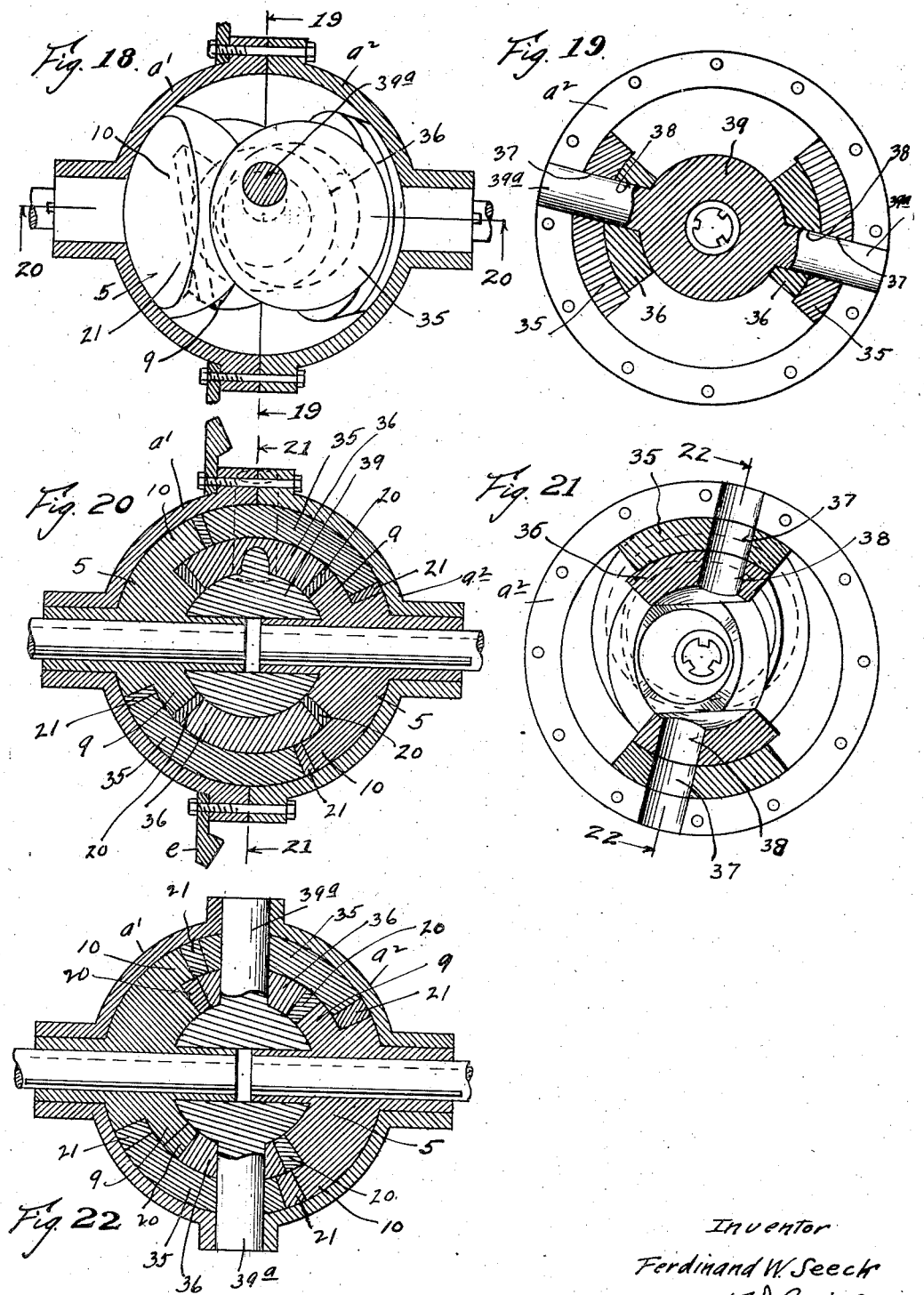

Patented Oct. 7, 1930

1,777,702

UNITED STATES PATENT OFFICE

FERDINAND W. SEECK, OF LEBANON, OREGON

DIFFERENTIAL MECHANISM

Application filed October 29, 1927. Serial No. 229,607.

My invention relates to gearless differential mechanisms and is an improvement of a gearless differential mechanism described in patents numbered 1,278,231 and 1,467,560, issued to me September 10, 1918, and September 11, 1923, respectively.

The principal object of my present invention is to provide an improved compact gearless differential mechanism which is relatively simple and durable, and which is adapted to be more economically manufactured and assembled than the differential mechanism described in my former patent.

Another object of my invention is to provide an improved gearless differential which may be assembled at the factory and shipped, to be readily installed on a motor vehicle as a substitute for its original gear differential.

A further object of my invention is to provide large bearing surfaces within and without the differential casing in order that the casing may be strengthened and with its enclosed mechanism mounted on anti-friction bearings within the differential housing of a motor vehicle as constructed to contain a gear differential.

A still further object of my invention is to provide a divided casing for my differential mechanism provided with flanges on the adjacent edges of the casing halves, by which the said casing halves may be bolted together and to which the usual ring gear may also be fastened.

I attain these and the other incidental objects in a differential mechanism comprising a divided driven casing the casing parts provided with abutting companion flanges for assembly and a ring gear secured to one of the casing parts. The casing parts are also formed with annular flanges about their eyes, providing internal and external extensions of its journal bearing surfaces and annular eccentric elements recessed on one side to receive said internal annular flanges of the casing parts and anti-friction bearings mounted on said external flanges.

The details of construction and mode of operation of my invention will be hereinafter described with reference to the accompanying drawings, in which:

Fig. 1 shows a side elevation of my improved differential the casing being shown in section to disclose the mechanism contained therein;

Fig. 2 shows a section taken on the line 2—2 of Fig. 1 looking in the direction of the arrows, but with the divided axle removed and illustrates the relative arrangement of the various parts;

Fig. 3 shows a section taken on the line 3—3 of Fig. 2, looking in the direction of the arrows, and illustrates further details of construction;

Fig. 4 shows a section taken on the line 4—4 of Fig. 1, looking in the direction of the arrows, with parts removed to illustrate the relative position of the annular eccentric member;

Fig. 5 shows an end elevation of the casing and illustrates how its two parts are bolted together;

Fig. 6 shows a section taken on the line 6—6 of Fig. 5;

Fig. 7 shows a perspective view of my differential adapted to have a spiral gear bolted between the flanges, one casing part being removed to disclose the inner mechanism;

Fig. 8 shows a side elevation of my differential mechanism, illustrating further details of this modification of the casing;

Fig. 9 shows the inside of one casing part and the various parts therein;

Fig. 10 shows a view similar to Fig. 9 except that one of the annular eccentric elements have been removed to disclose further details of construction;

Fig. 11 shows a section taken on the line 11—11 of Fig. 8 with the gear removed and illustrates the details of construction;

Figure 12:
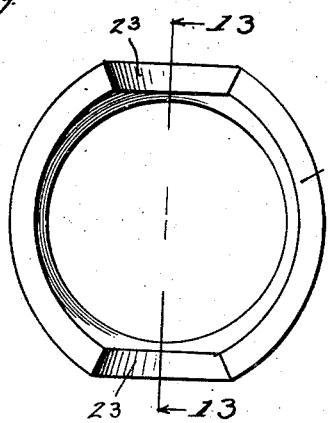
Figs. 12, 13 and 14 show elevations of one of the bearing rings of my differential, Fig. 13 being shown in a section taken on line 13—13 of Fig. 12.
Figure 13:
Figure 14:
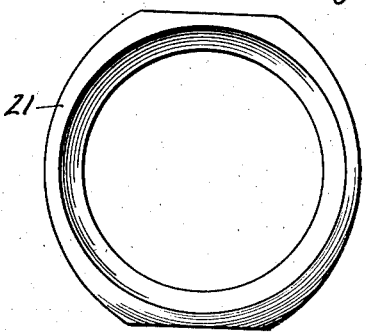
Figure 15:
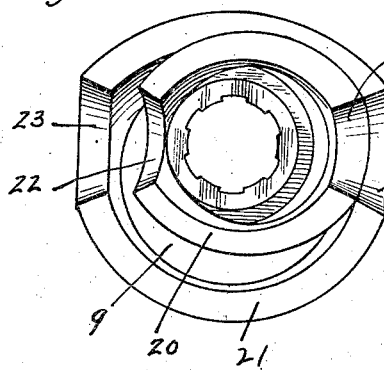
Figure 16:
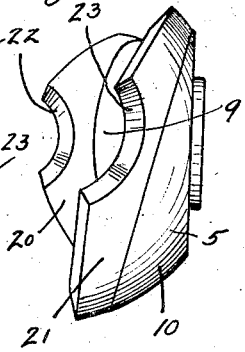
Figure 17:
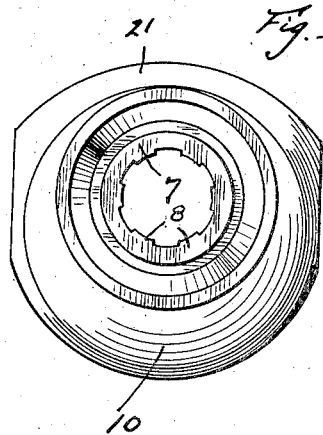

Figs. 15, 16, and 17 show elevations of one of the annular eccentric elements with the bearing rings mounted in place on it;

Fig. 18 shows diagramatically a modification of my differential, in which the transverse member and transmission members have been simplified;

Fig. 19 shows a section taken on the line 19—19 of Fig. 18, looking in the direction of the arrows, and illustrates the details of construction;

Fig. 20 shows a section taken on the line 20—20 of Fig. 18 looking in the direction of the arrows and illustrates further details of construction;

Fig. 21 shows a section taken on the line 21—21 of Fig. 20, looking in the direction of the arrows; and Fig. 22 shows a section taken on the line 22—22 of Fig. 21 looking in the direction of the arrows.

Referring now to Figs. 1 and 5, my improved gearless differential as adapted to be installed in the usual differential housing, comprises a casing $a$ of two parts $a'$ and $a^2$ provided with peripheral flanges $b$ and $c$, respectively.

The flange $b$ is formed of substantial thickness and is provided with bolt holes $b'$. A ring gear $e$ is fastened by means of rivets $e'$ inserted through alternate holes to the outside of the said flange. The flange $c$ comprises a number of ears provided with holes $c'$, which project beyond the periphery of the casing part $a^2$ and are spaced so as to register with the other alternate holes of the flange $b$. The casing parts are then fastened together with bolts $d$ inserted thru the latter alternate holes. Raised portions $b^2$ are provided on the flange $b$ corresponding to the ears of the flange $c$, to strengthen the flange $b$ and permit the bolts $d$ to be threaded into the said holes without the use of nuts on their ends.

The casing $a$ is also provided with lubricant circulation hole $p$.

The ring gear $e$ is adapted to mesh with a pinion gear not shown in the drawings which is affixed in the usual manner to the drive shaft of a motor vehicle.

In Figs. 7 and 8, I show a slight modification of the casing in which the casing parts $a^3$ and $a^4$ are provided with similar flanges $b^3$ and $c^3$ and a spiral ring gear $e^2$ is bolted between them, by bolts $d'$ which also serve to fasten the casing parts together. This form is adapted for motor trucks and the like, where spiral gears are used in the place of bevel gears.

The casing parts in both forms are provided with central eyes $j$ about which internal annular flanges $k$ and external similar flanges $l$ are formed. The external flanges serve to provide a bearing surface on which anti-friction bearings may be mounted, for the rotation of the casing within the differential housing.

Referring now to Figs. 1 to 6 and 12 to 17, a transverse member $f$ is connected at each end to the casing halves in recesses $h$ formed in the edges of the said casing parts. The member $f$ is provided with a central hole $f'$ for the circulation of lubricant and with bi-symetrical flanges $g$ about each side of the hole $f'$, but spaced therefrom forming a recess. The ends are milled to fit closely in the recesses $h$, and are provided with holes $h'$ through which two of the bolts $d$ will be inserted. The member $f$ is also tapered somewhat, outwardly from the flanges $g$ as at $i$, toward the milled ends, and the sides normal to the flange $g$ are rounded.

As before described, the member $f$ is fixed to and rotates with the casing $a$.

Semi-circular transmission members 2 and 3 are provided formed with convex inner surfaces and concave outer surfaces. The two transmission members are identical in form except the member 3 is smaller.

The members 2 and 3 are formed with circular central portions $2^a$ and $3^a$ respectively and with holes $2^b$ and $3^b$ in their centers which serve no purpose except to permit the circulation of lubricant.

Two sets of the transmission members are provided, the member 3 which is smaller is arranged within the semi-circle of the larger, and each set is adapted to be arranged on the opposite sides of the member $f$, the central portion $3^a$ of the member 3 bearing on the outer surface of the flanges $g$, and the extremities of both members which are convex bearing against the rounded sides $i$ of the member.

Two double eccentric elements 5 are provided adapted to be seated at their outed ends for rotation in the eyes $j$ and the internal flanges $k$ of their respective casing parts, and at their other ends within the flanges $g$ of the member $f$. The double eccentric elements comprise a central annular portion 7 provided with internal splines 8, in which the divided axles 11 are fastened and concave portions 9 formed eccentrically about the said annular portion 7 and a larger concave eccentric portion 10 integral therewith, but with its eccentricity at an angle of rather less than ninety degrees to the smaller eccentric portion. A semi-circular recess 12 is formed between the annular portion 7 and the eccentric portions 9 in which the internal annular flange $k$ of the casing is received.

Two sets of bearing rings are provided, each set comprising a large ring 21 and a similar small ring 20, which are concavo-convex, the smaller ring being arranged concentrically within the larger, and each set is adapted to be arranged about a double eccentric member, the larger ring bearing on the eccentric portion 9 and the smaller on the eccentric portion 10 and between the said double eccentric member and the transmission members 2 and 3. Opposite semi-circular notches 22 and 23, are provided in the said rings, respectively, in which the peripheries of the circular portions $2^a$ and $3^a$ of the transmission members 2 and 3 bear.

In the operation of my differential when both wheels of a motor vehicle are turning at the same rate, the casing and the enclosed mechanism will rotate with the divided axle shaft as a unit.

In the ordinary gear differential, power is always given to the wheel having the least resistance from the road surface, i. e., the poorest traction and if one wheel has no resistance the car will not be given a forward motion.

However, in my differential, if one wheel receives less effective traction than the other, and tends to turn more rapidly, the eccentric member of that wheel will wedge the transmission members tightly against the case $a$, and against the other eccentric element, thus power will be transmitted to the wheel receiving the most effective traction.

It can be easily understood that if the difference in the effective traction of wheels is very slight, the friction of the transmission members will be slight and the parts will be able to by-pass one another, thus transmitting the power proportionately to the wheels receiving, the greater and less tractive resistance.

Or when the difference in the tractive resistance of the two wheels is great, the throw of the transmission members will be great and the parts cannot by-pass thus transmitting all or nearly all the power to the wheel receiving the most effective transmission.

Referring to Figs. 18 to 22, I have shown a modification of my invention, which differs from the previously described forms in that the larger transmission members 35 and the smaller transmission members 36, equivalent to the transmission elements 2 and 3 previously described, are formed as concavo-convex discs arranged one over the other and provided with eccentric bores 37 and 38.

The transverse member 39 also differs from the member $f$, previously described in that its ends $39^a$ are cylindrical in cross section and the transmission members 35 and 36 are mounted, one set over each of the said ends $39^a$ in the eccentric bores 37 and 38, and the inner and smaller transmission member 36 bears against the bi-symmetrical flanges $39^a$ of the transverse member 39, as in the other forms of my invention.

The other features of this modification are exactly the same as those previously described and the operation is identical.

The special advantage of this form of my invention is its simplicity and economy of manufacture, and while not so strong as the preferred form may be advantageously used in light motor vehicles.

I claim:

1. In a differential mechanism of the character described, a divided driven casing, the casing parts provided with abutting companion flanges for assembly, said companion flanges bored, bolts inserted in said bores, the flange of one of said casing parts having portions cut away between said bores, to expose the underlying surfaces of the companion flange of the other casing part, and a ring gear secured to the last mentioned casing part by fastening elements inserted through said exposed flange portions, whereby the case parts may be dissembled without disturbing the fastening of the said ring gear.

2. In a differential mechanism of the character described the combination of a divided driven case, each case part provided with a central opposite eye formed with an interior and exterior annular flange about the said eye, providing an internal and external extension of its journal bearing surface, and annular eccentric elements recessed on one side to receive said annular flanges of the case parts.

3. In a differential mechanism of the character described a divided driven casing the halves thereof formed with registering eyes to receive the axle ends, interior and exterior flanges formed about the said eye of each casing half, said flanges forming bearing surfaces, annular eccentric elements inserted in said casing halves on the bearing surfaces of said flanges, and a transverse member fixed between said casing halves, said transverse member provided with lateral central segmental spherical surfaces having plane sides formed with annular recesses, in which the inner ends of said eccentric elements are supported, arcuate transmission members mounted over said spherical surfaces of the transverse member.

4. In a differential mechanism of the character described a divided driven casing the halves thereof formed with registering eyes to receive the axle ends, interior and exterior flanges formed about the said eye of each casing half, said flanges forming bearing surfaces, annular eccentric elements inserted in said casing halves and recessed respectively in one end to receive said internal flanges of the casing halves, a transverse member fixed between said casing halves said transverse member provided with lateral central segmental spherical surfaces having plane sides formed with annular recesses, in which the inner ends of said eccentric elements are supported, and arcuate transmission members mounted over said spherical surfaces of the transverse member.

5. In a differential mechanism of the character described a divided driven casing the halves thereof formed with registering eyes to receive the axle ends, interior and exterior flanges formed about the said eye of each casing half, said flanges forming bearing surfaces, annular eccentric elements inserted in said casing halves and recessed respectively in one end to receive said internal flanges of the casing halves, a transverse member fixed between said casing halves said transverse member provided with lateral central segmental spherical surfaces having plane sides formed with annular recesses, in which the inner ends of said eccentric elements are supported, arcuate transmission members mounted over said spherical surfaces of the transverse member, and concavo-convex bearing rings mounted on said annular eccentric elements and bearing against the sides of said arcuate transmission members.

FERDINAND W. SEECK.